United States Patent [19]

Bälz

[11] Patent Number: 4,643,226

[45] Date of Patent: Feb. 17, 1987

[54] SLIDE GATE VALVE

[75] Inventor: Jürgen Bälz, Weinsberg, Fed. Rep. of Germany

[73] Assignee: Schubert & Salzer, Ingolstadt, Fed. Rep. of Germany

[21] Appl. No.: 679,256

[22] Filed: Dec. 7, 1984

[51] Int. Cl.$^4$ ............... F16K 3/314; F16K 11/065
[52] U.S. Cl. ........................ 137/625.33; 251/326; 251/328
[58] Field of Search .................... 251/326, 328; 137/625.33

[56] References Cited

U.S. PATENT DOCUMENTS

| | | | |
|---|---|---|---|
| 2,827,260 | 3/1958 | Jordan | 137/625.33 X |
| 3,183,926 | 5/1965 | Boudot | 251/326 X |
| 3,517,697 | 6/1970 | Hott, Jr. et al. | 137/625.33 |
| 3,955,591 | 5/1976 | Baumann | 251/326 X |
| 4,150,693 | 4/1979 | Generey et al. | 251/328 X |
| 4,201,365 | 5/1980 | Paptzun et al. | 251/326 X |
| 4,489,756 | 12/1984 | Balz | 251/328 X |

Primary Examiner—Arnold Rosenthal
Attorney, Agent, or Firm—Dority & Manning

[57] ABSTRACT

A slide gate valve having a flangeless housing clamped between the ends of two pipelines which housing has an inner chamber, enlarged between the ends of the pipelines, for accommodating a stationary valve plate. An associated displaceable valve plate is provided with an annular insert having approximately the same inside diameter as the adjacent pipeline on the discharge side in the housing, against which insert the stationary valve plate is supported as a seal in a small annular area opposite the sealing surface between the insert and the pipeline. The remaining area of the stationary valve plate is free of support from both the insert and the housing.

13 Claims, 4 Drawing Figures

SLIDE GATE VALVE

FIELD OF THE INVENTION

The present invention relates to a slide gate valve with a flangeless housing clamped between the ends of two pipelines, which housing has an inner chamber, enlarged adjacent the pipelines, for accommodating a stationary valve plate and an associated displaceable valve plate.

BACKGROUND OF THE INVENTION

The stationary valve plate in slide gate valves of this type is axially clamped near its outer periphery (U.S. Pat. No. 3,955,591). To create the necessary displacement path for the movable valve plate, the housing has an inner chamber which is increased in diameter opposite the adjacent pipelines. To obtain a perfect seal between the valve housing and the adjacent pipelines, even when the valve is incorrectly installed, a certain size of sealing surface between the valve housing and the pipeline is specified, so that the sealing surface extends radially inwards over the supporting area of the stationary valve plate, the supporting area being predetermined by the size of the inner chamber of the housing. The supporting area, facing towards the inner chamber of the housing, of the stationary valve plate is consequently smaller than the supporting area between the stationary valve plate and the end of the adjacent pipeline. This causes the stationary valve plate to become distorted when the bolts connecting the housing to the flanges of the pipeline are overtightened and especially if they are tightened non-uniformly. This leads to a nonuniform seating of the displaceable valve plate against the stationary valve plate, so that a perfect sealing function of these two valve plates is no longer ensured. This can also be caused when there is a high medium pressure.

SUMMARY OF THE INVENTION

The object of the invention is therefore to design a slide gate valve in such a way that, irrespective of the operating conditions and of how carefully the valve is installed, a perfect sealing function of the valve plates is always ensured.

According to the invention, this object is achieved when an annular insert having approximately the same inside diameter as the adjacent pipeline is provided on the discharge side in the housing, against which insert the stationary valve plate is supported as a seal in a small, annular area opposite the sealing surface between the insert and the pipeline, whereas the remaining area of the stationary valve plate is free of support both opposite the insert and the housing. Because of the relatively small annular supporting surface for the stationary valve plate, an absorption area is created for the stresses which are produced by incorrect tightening of the clamping bolts which clamp the housing or by the medium pressure. Since the stationary valve plate, apart from in this annular area, is free of support, distortion caused by bending moments cannot occur. The stationary valve plate is surrounded by a clearance space, apart from the surface supported at the insert, so that the stationary valve plate can be displaced, expand and effectively bend. Consequently, if the displaceable valve plate is deformed as a result of the medium pressure, the stationary valve plate can adapt to this deformation unimpaired, so that the two valve plates can still sit against one another and form a perfect seal.

The annular insert has different designs. It is preferably connected in one piece to the stationary valve plate. This is the most reliable way to ensure a perfect seal between the insert and the stationary valve. However, the annular insert and the stationary valve plate can also be connected to one another, especially when there are complicated profiles, preferably by a plasma-welded joint.

According to another expedient embodiment of the inventive subject, the annular insert has a support shoulder against which is suported the stationary valve plate by the end face of a concentric projection, with the stationary valve plate, subsequent to this end face, advantageously having a centering projection which is radially guided in the insert.

According to a preferred embodiment, the stationary valve plate is not supported at an arbitrary area on the annular insert, but at its outer edge area. By this means, it can be ensured in the design and in an especially simple manner that the stationary valve plate can be displaced, expand and bend in order to ensure in this way a perfect sealing function between the two valve plates. Moreover, an annular web may be expediently provided for supporting the stationary valve plate at the annular insert, which annular web is formed in one piece with the annular insert. In this connection, so that stresses which may occur can be absorbed not only in the stationary valve plate edge area supported at the annular insert, it is possible to design the stationary valve plate in such a way that it has an annular section, having a reduced cross-section, between the edge area supported at the annular insert and the sealing area interacting with the displaceable valve plate.

Slide gate valves with a flangeless housing clamped between the ends of two pipelines have so far not been able to find acceptance in practice, because incorrect installation of such a housing always leads to valves with faulty seals. The present invention creates a solution for the first time, by means of which it becomes impossible to impair the slide gate valve on installation, irrespective of the training and skill of the personnel. Moreover, the solution is not tied to a special design of a slide gate valve, but can find application in all gate valves in which shut-off and release is effected by two slides sliding relative to one another. By means of the invention, therefore, a solution, in keeping with practice, for a slide gate valve having a flangeless housing is created for the first time. Moreover, this solution is simple in construction and cost-effective in production.

BRIEF DESCRIPTION OF THE DRAWINGS

The construction designed to carry out the invention will be hereinafter described, together with other features thereof.

The invention will be more readily understood from a reading of the following specification and by reference to the accompanying drawing(s) forming a part thereof, wherein an example of the invention is shown and wherein.

DESCRIPTION OF A PREFERRED EMBODIMENT

Figure 1:
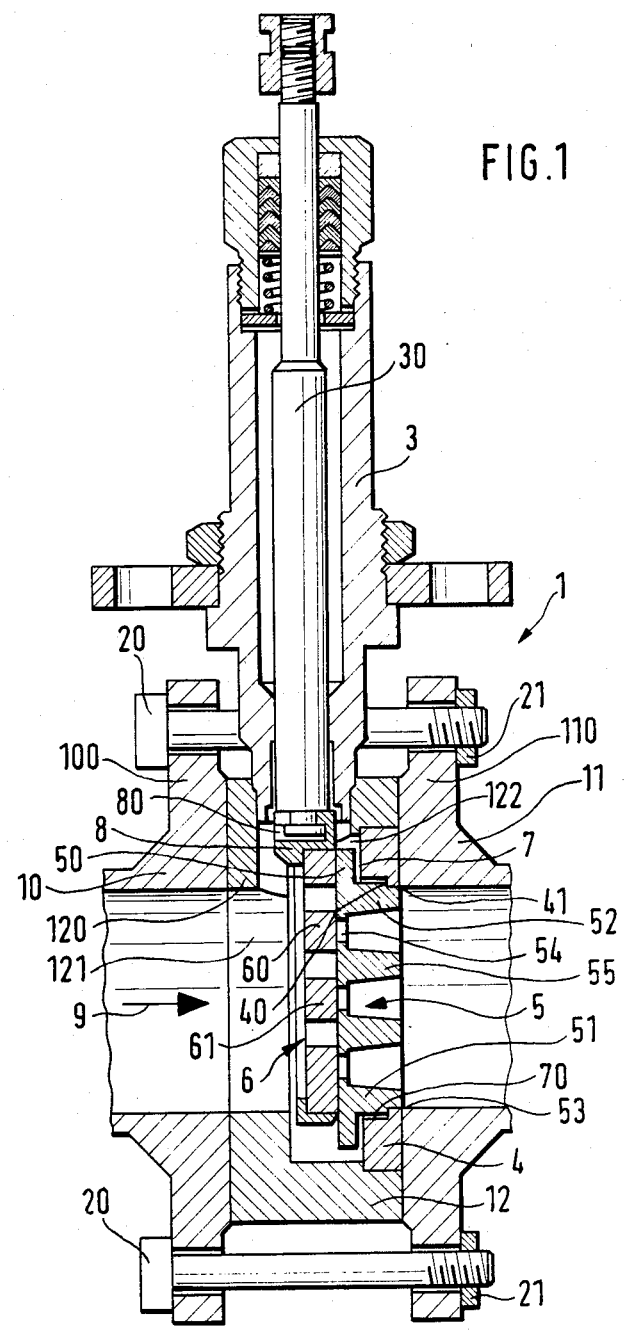
FIG. 1 shows a longitudinal section through a slide gate valve designed according to the invention.

A first illustrative embodiment of a slide gate valve 1 is first of all described with reference to FIGS. 1 and 2. This slide gate valve 1 has a flangeless housing 12 which is clamped between the ends 10 and 11 of two pipelines. For this purpose, each end 10 and 11 has a flange 100 and 110, respectively, which are tightened against one another by bolts 20 and nuts 21 and at the same time clamp the housing 12 between them in the manner of a seal. An upper part 3 is connected to the housing 12, in which upper part 3 a valve stem 30 is guided in a sealed and known manner. The drive and the necessary sealing elements are generally known so that a description of them can be dispensed with.

The housing 12 essentially has the shape of a pot with an opening 121 in its base 120, with the cross-section of the opening 121 being essentially the same size as the free inside diameter of the pipe ends 10 and 11. The housing 12 has adjacent the opening 121 and beyond the inside diameter of the two pipelines (pipe ends 10 and 11) an enlarged inner chamber 122 for accommodating a stationary valve plate 5 and a displaceable valve plate 6 sitting as a seal against this stationary valve plate 5.

As shown by the arrow 9 indicating the direction of flow, this displaceable valve plate 6 is located on the supply side of the stationary valve plate 5. An annular insert 4 extending to the inner chamber 111 of the pipe end 11 is provided on the discharge side in the housing, against which insert 4 is supported the stationary valve plate 5, which will be described hereinafter in detail.

As mentioned, the inner chamber 122 of the housing 12 is enlarged relative to the inner chamber 111 and also 101 of the pipe ends 11 and 10 because, on the one hand, the inside diameter of the pipes is specified, but on the other hand, space is additionally required for the displacement path of the displaceable valve plate 6. However, the housing 12 has to be connected to the ends 10 and 11 of the adjacent pipelines by respective contact surfaces of equal area. This is achieved on the supply side of the housing 12 by the base 120, which is drawn radially inwards. For assembly reasons, such a base is not possible on the discharge side, which is why the insert 4 is provided as far as the inner chamber 111 of the pipe end 11. Between the two pairs of contact surfaces at the two end faces of the housing 12 is located a sealing washer 102 or 112 which covers the entire contact surface.

Consequently, when the housing 12 is being clamped between the pipe ends 10 and 11, the insert 4 is clamped—under the interposition of the sealing washer 112—between an annular shoulder 123 of the housing part 12 and the pipe end 11.

Figure 2:
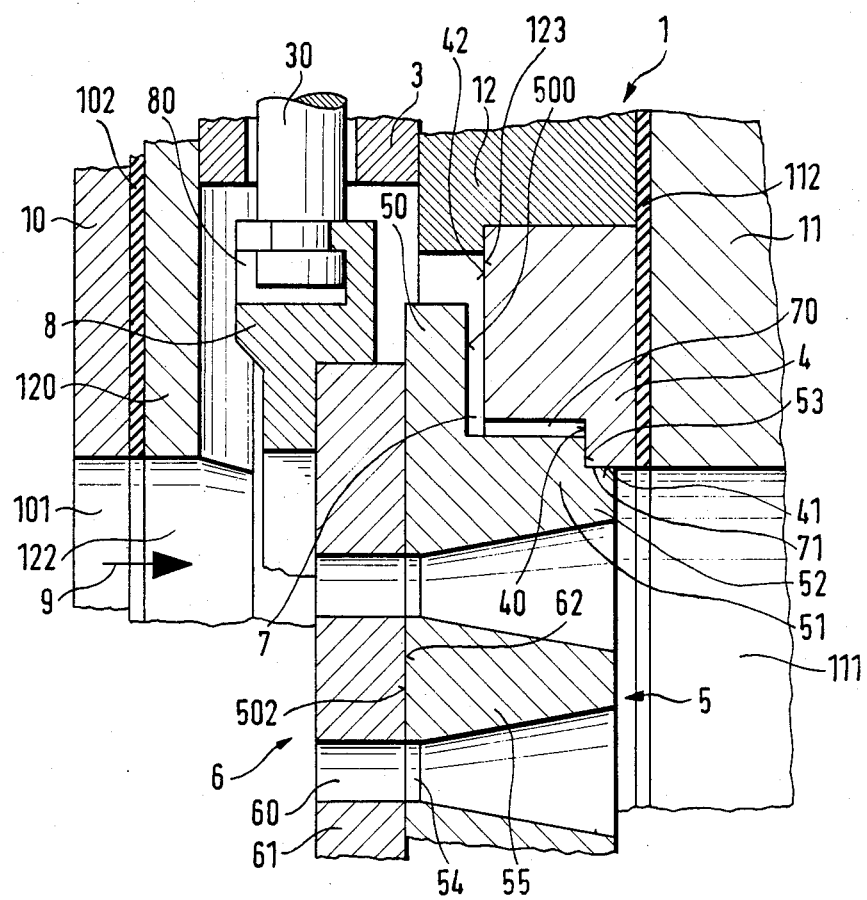
FIG. 2 shows a longitudinal section through a detail of the slide gate valve shown in FIG. 1.

In the illustrative embodiment shown in FIGS. 1 and 2, the annular insert 4 has a stepped inside diameter and consequently has a shoulder 40 for the stationary valve plate 5, which is supported from the side facing towards the inner chamber 122 of the housing 12 by an end face 53 at this shoulder 40. The stationary valve plate 5 has a first longitudinal section 50 which interacts with the displaceable valve plate 6. This first longitudinal section 50 overlaps the annular housing section 4 in the radial direction; however, it does not sit against the latter but leaves a clearance 7 between itself and this annular housing section 4. Adjoining this first longitudinal section 50 is a second longitudinal section 51, which has a smaller outside diameter than the first longitudinal section 50 and is offset in the form of a step relative to the latter. Because a radial clearance 70 is left, this second longitudinal section 51 extends into the annular insert 4 and is supported by the end face 53 of this longitudinal section 51 at the above-mentioned shoulder 40 of the insert 4. A third longitudinal section 52 adjoins this second longitudinal section 51 of the valve plate 5, the outside diameter of which longitudinal section 52 is reduced vis-a-vis the second longitudinal section 51 in the form of a step. This third longitudinal section 52 projects beyond the shoulder 40 of the annular insert 4. The outer periphery of this third longitudinal section 52 is connected as a seal to the inner peripheral surface 41 of the insert 4 and, moreover, forms a centering projection radially guided in the insert 4. The stationary valve plate 5 is, in this way, centered and fixed in the housing 12.

The stationary valve plate 5 of the slide gate valve 1 shown has several slots 54 located transversely to the displacement direction of the valve plate 6 driven by the valve stem 30, which slots 54 are separated from one another by webs 55.

In a similar way, the displaceable valve plate 6 also has an equal number of slots 60 which can be brought into alignment with the slots 54 of the stationary valve plate 5. On the other hand, however, the slots 54 can also be covered by the webs 61 between the slots 60.

To drive the valve plate 6, the latter is arranged in a recess 80 of an annular carrier 8 which, in turn, is connected as a drive to the valve stem 30 projecting into the housing 12. For sealing, the valve plate 6 is held in a suitable manner in resilient contact against the valve plate 5.

The medium to be regulated flows through the shown slide gate valve 1 in the direction of arrow 9. Moreover, this medium exerts a pressure on the movable valve plate 6 which transmits this pressure to the stationary valve plate 5.

To install the housing 12 of the slide gate valve 1, the housing 12 is placed at its two end faces, together with one sealing washer each (102 and 112), between the two ends 10 and 11 of two pipelines. The bolts 20 are then tightened. The annular insert 4 is clamped on both sides in the area of its outer periphery and, when the housing 12 is being clamped, cannot give way to the pressure developing between the flanges 100 and 110. In the area of the inner chamber 122, however, the annular insert 4 is not supported and gives way to the pressure and moves the stationary valve plate 5 slightly away from the pipe end 11. Because the stationary valve plate 5 is only supported as a seal in the small annular area opposite the sealing surface formed by the sealing washer 112 and in its remaining area is free of support both opposite the annular insert and housing 12, the bending stresses produced in the insert are not transmitted to the stationary valve plate 5. By this means, this valve plate 5, over the entire sealing area 502, remains in parallel and consequently also sealed contact at the sealing area 62 of the displaceable valve plate 6. This does not just apply when the bolts 20 are overtightened, but also when they are tightened non-uniformly. The large sealing surfaces formed by the sealing washers 102 and 112 prevent the medium from leaking to the outside or past the outer periphery of the annular insert 4 into the inner chamber 111 of the pipe end 11, whereas the sealed contact of the stationary valve plate 5 at the annular insert 4 prevents the medium from leaking between these two parts.

Because of the necessary cross-section of flow of the slots 54 and 60 and because of the necessary supporting surface between the two valve plates 5 and 6, a certain minimum surface is required in the design of the valve plates 6 and 5 so that they can mutually cover or uncover the slots 54 and 60, which minumum surface cannot fall below this minimum value. The relatively large surface of the valve plates 5 and 6 is consequently exposed to the medium to be regulated so that a large force is active which causes the two valve plates 6 and 5 located relative to one another to deform. Moreover, the deformation is at its greatest at the center of the valve plates 6 and 5. Because the valve plate 5 is only connected to the inner peripheral surface 41 of the annular insert 4, the deformed valve plate 5 only forms a concave curvature. The edge area, relieved as a result of the gap or the clearance 7, of the longitudinal section can deviate during this deformation in the opposite direction to the direction of flow, indicated by arrow 9, of the medium, with the clearance 70 providing the necessary freedom of movement. Because the stationary valve plate 5 can adapt to the pressure loading it, it is deformed to the same extent as the displaceable valve plate 6 which is supported against it, without a gap developing between the two valve plates. Ingress of dirt particles between the two valve plates 5 and 6 is consequently also prevented. This ensures that the slide gate valve 1 functions reliably for a long time.

The seating is also not impaired by the respective working position of the movable valve plate 6 because the stationary valve plate 5 can adapt to the pressure acting on it. Also, the slots 54 and 60 in no way impair the seating of the movable valve plate 6 against the stationary valve plate 5, because these slots 54 and 60 are provided in a similar manner in both the stationary valve plate 5 and in the movable valve plate 6. Moreover, the same flexing ability is ensured by an appropriate material selection and by suitable material strengths for the two valve plates 5 and 6.

The inventive subject can be modified in different ways. In principal, therefore, it is adequate if the stationary valve plate 5, at its end face 53, sits against the shoulder 40 of the annular insert 4, with a perfect seal then being ensured by interposing an adequate sealing member. The stationary valve plate 5 then has to be kept in contact at the annular insert 4 by an elastic element (not shown), for example, by a compression or lamellar spring, etc.

However, if it has to be taken into account that large variations in pressure can occur, the contact pressure against the stationary valve plate 5, which pressure is imparted to the displaceable valve plate 6 by an elastic element (not shown), may not be sufficient to ensure a seal. In this event, the stationary valve plate 5 and the annular insert 4 are connected to one another as a seal. A plasma-welded joint 71 is particularly suitable for this purpose, because this is particularly low in stress. The welded joint 71 can be provided between the end face 53 and the shoulder 40 or—as in the illustrative embodiment shown in FIGS. 1 and 2—between the inner periphery surface 41 of the insert 4 and the third longitudinal section 52, to be provided in this case, of the valve plate 5.

Further modifications of the inventive subject come within the scope of the present invention by interchanging elements or replacing them with equivalent elements and by combinations of these elements. Thus, for example, according to FIG. 3, provision is made for the stationary valve plate 5 to be supported at its first longitudinal section 50 against a radial surface 42 of the annular insert 4. According to FIG. 3, the stationary valve plate 5 is supported at the outer edge area of the annular insert 4. The latter has an annular web 43 on its radial surface 42, which annular web 43 forms the supporting shoulder for the stationary valve plate 5. Moreover, the supporting surface of the stationary valve plate 5 is formed by the outer peripheral area of the end face 500 of the longitudinal section 50, which end 500 faces away from the displaceable valve plate 6.

In this illustrative embodiment, the stationary valve plate 5, on both its side facing towards the inner chamber 122 of the housing 12 and its side facing towards the annular insert 4, is axially clamped in each case in an annular area of the same size. In the remaining area, the stationary valve plate 5 is always located at a distance from the insert 4 and is therefore free of support. Because of the axial and radial clearance 7 and 70 formed by this means, bending moments which occur cannot be transmitted to the stationary valve plate 5 by deformation of the insert 4 in this clearance.

Figure 3:
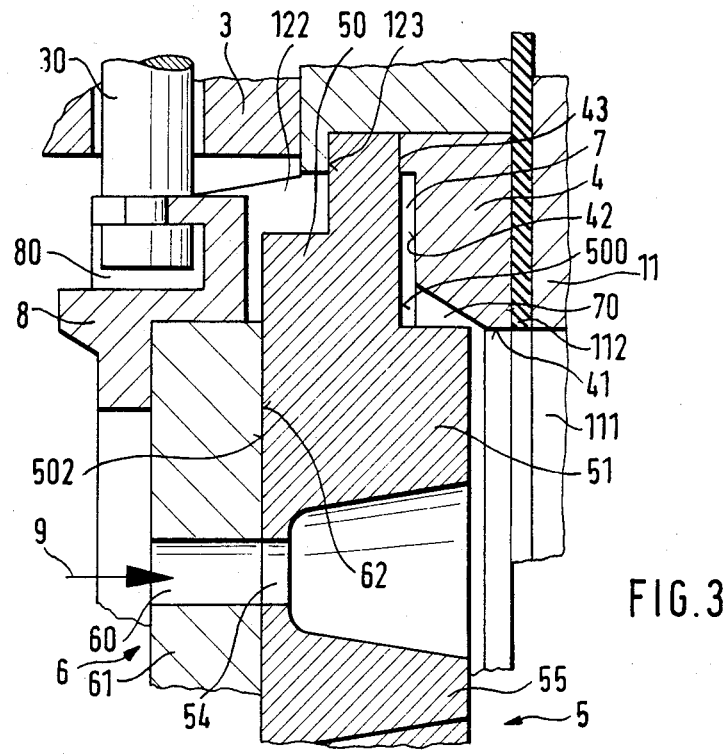
FIG. 3 shows a longitudinal section of a modification of the detail, shown in FIG. 2, of the slide gate valve according to the invention.

According to the illustrative embodiment in FIG. 3, the annular web 43 is formed in one piece with the annular insert 4, but it is also possible to design the annular web as an integrated component of the stationary valve plate 5 or also as a separate ring which is inserted between the stationary valve plate 5 and the annular insert 4.

It is also not necessary for the first longitudinal section 50 of the stationary valve plate 5 to have a completely flat surface on its side facing towards the displaceable valve plate 6. As shown by FIGS. 2 and 3, the first longitudinal section 50 can also be subdivided into a sealing area 502 guiding the displaceable valve plate 6 and a supporting area forming a portion of a supporting surface (e.g. end face 500 or annular web). Moreover, this supporting area projects beyond the sealing area 502 in the radial direction, whereas the sealing area 502 is of a size which is only necessary for the perfect guidance of the displaceable valve plate 6.

Figure 4:
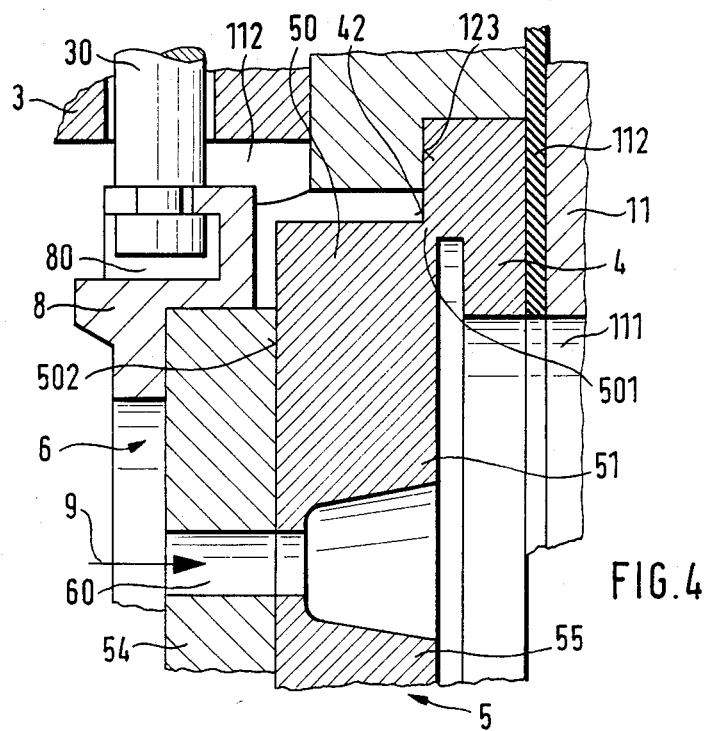
FIG. 4 shows a longitudinal section of another modification of the detail, shown in FIG. 2, of the valve according to the invention.

According to FIG. 4, the annular insert 4 is designed in one piece with the stationary valve plate 5, it being possible to produce this combined part by stress-relieved or plastic shaping. However, the stationary valve plate 5 and the annular insert 4 can also be inseparably connected to one another as a seal—just as in the design according to FIG. 3—for example, by plasma welding.

According to FIG. 4, in order to improve the elasticity between the insert 4 and the stationary valve plate 5, especially when these parts are inseparably connected to one another, an annular section 501 having a reduced cross-section is additionally provided between the annular supporting area—which is formed by the welded joint 71 (see FIG. 2) or transitional area between the insert 4 and the stationary valve plate 5—and the sealing area 502, interacting with the displaceable valve plate 6, of the stationary valve plate 5.

In the illustrative embodiment shown, the two valve plates 5 and 6 are designed as slotted plates, but other designs having round or curved flow passages in the valve plates 5 and 6 are possible depending on the application.

If it is ensured that the stationary valve plate 5 can be displaced, expand and effectively bend in order to remain in this way always in parallel and consequently also in sealing contact against the movable valve plate 6, an elastic seal can also be provided between the surface, not supported at the insert 4, of the stationary valve plate 5 and the annular insert 4. Because this seal does not transmit any moments or forces, it also does not form a support for the stationary valve plate 5.

It will be understood, of course, that while the form of the invention herein shown and described contitutes a preferred embodiment of the invention, it is not intended to illustrate all possible forms of the invention. It will also be understood that the words used are words of description rather than of limitation and that various changes may be made without departing from the spirit or scope of the invention herein disclosed.

I claim:

1. A slide gate valve for pipeline, comprising:
   (a) a stationary valve plate;
   (b) a displaceable valve plate associated with said stationary plate;
   (c) a flangeless housing adapted for being clamped between the ends of two pipelines, said housing having an inner chamber which is axially enlarged between the two pipeline ends for accommodating said stationary and displaceable valve plates, and slightly radially enlarged on a discharge side thereof for receiving said plates, but having an inside diameter on an inlet side thereof substantially the same as that of the adjacent pipeline end; and
   (d) an annular insert having substantially the same inside diameter as an adjacent pipeline, said insert being provided on a discharge side within said flangeless housing, having a pipeline sealing surface between itself and said adjacent pipeline, said a plate sealing surface between itself and said stationary plate, said plate sealing surface having a substantially smaller area than said pipeline sealing surface so as to reduce forces transmitted to said stationary plate through said insert during on-site clamping of said housing between the ends of two pipelines; wherein
   said stationary plate is supported against said insert as a seal in a small annular area of said stationary plate in contact with said plate sealing surface, and further wherein the remaining area of said stationary valve plate and said insert define a clearance therebetween.

2. A valve as in claim 1, wherein said annular insert is connected to said stationary valve plate.

3. A valve as in claim 2, wherein said annular insert and said stationary valve plate are connected to one another so as to form one piece.

4. A valve as in claim 2, further comprising solidified weld material at a junction where said annular insert and said stationary valve plate are connected to one another.

5. A valve as in claim 3 including a concentric projection formed in said stationary plate and having an end face, and wherein said plate sealing surface of said annular insert forms a supporting shoulder against which is supported said stationary valve plate at said end face of said concentric projection.

6. A valve as in claim 5, including a centering projection associated with said concentric projection, said centering projection extending beyond the shoulder of said annular insert.

7. A valve as in claim 1, wherein said stationary valve plate is supported at an outer edge area thereof by said annular insert.

8. A valve as in claim 7, further including an annular web for supporting said stationary valve plate at an outer edge area of said annular insert.

9. A valve as in claim 8, wherein said annular web is integrally formed in one piece with said annular insert.

10. A valve as in claim 7, wherein said stationary valve plate has an annular section which has a reduced cross-section, said reduced cross-section being located between said edge area supported by said annular insert and a sealing area defined by said association of said displaceable valve plate and said stationary valve plate.

11. A valve as in claim 1 wherein said clearance comprises an axial clearance between said stationary valve plate and said annular insert.

12. A valve as in claim 1 wherein said clearance comprises axial and radial clearance between said stationary valve plate and said annular insert.

13. A slide gate valve for placement between adjacent ends of two pipelines, comprising:
   a first valve plate;
   a second valve plate disposed adjacent said first valve plate;
   a flangeless housing adapted to be received between said adjacent ends of said two pipelines, said housing defining a chamber for receiving said first and second valve plates, said chamber having an inlet-side inside diameter the same as that of the adjacent pipeline; and
   an insert disposed within said chamber on a discharge side thereof, said insert having surfaces on opposite axial sides thereof, one of said surfaces being faced by a side surface of one of said valve plates and contacting a portion of same to support and seal such plate, and the other of said surfaces facing one of said pipeline ends so as to seal said one pipeline end, said one of said insert surfaces being smaller than said other of said insert surfaces, wherein said insert and the remaining portion of said side surface of said one valve plate contacted by said insert defined a clearance therebetween.

* * * * *